INVENTOR
Frank Wittmann
By W. W. Williamson
Atty.

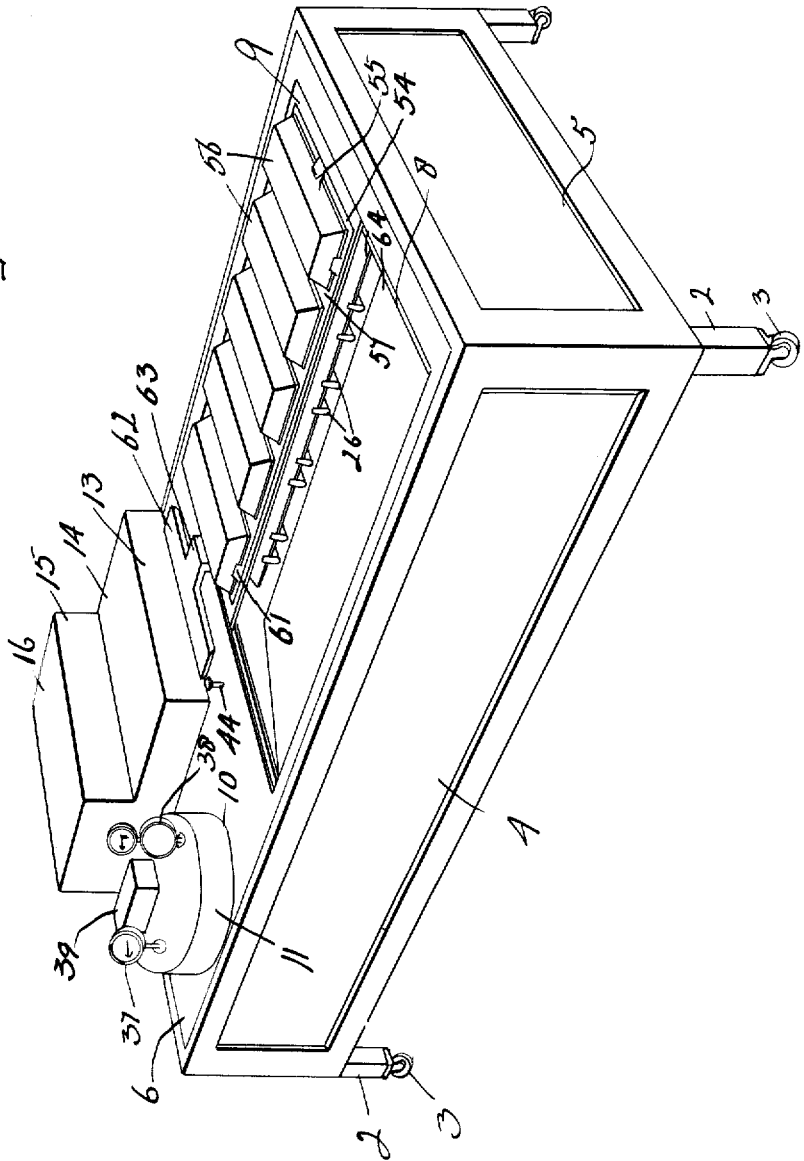

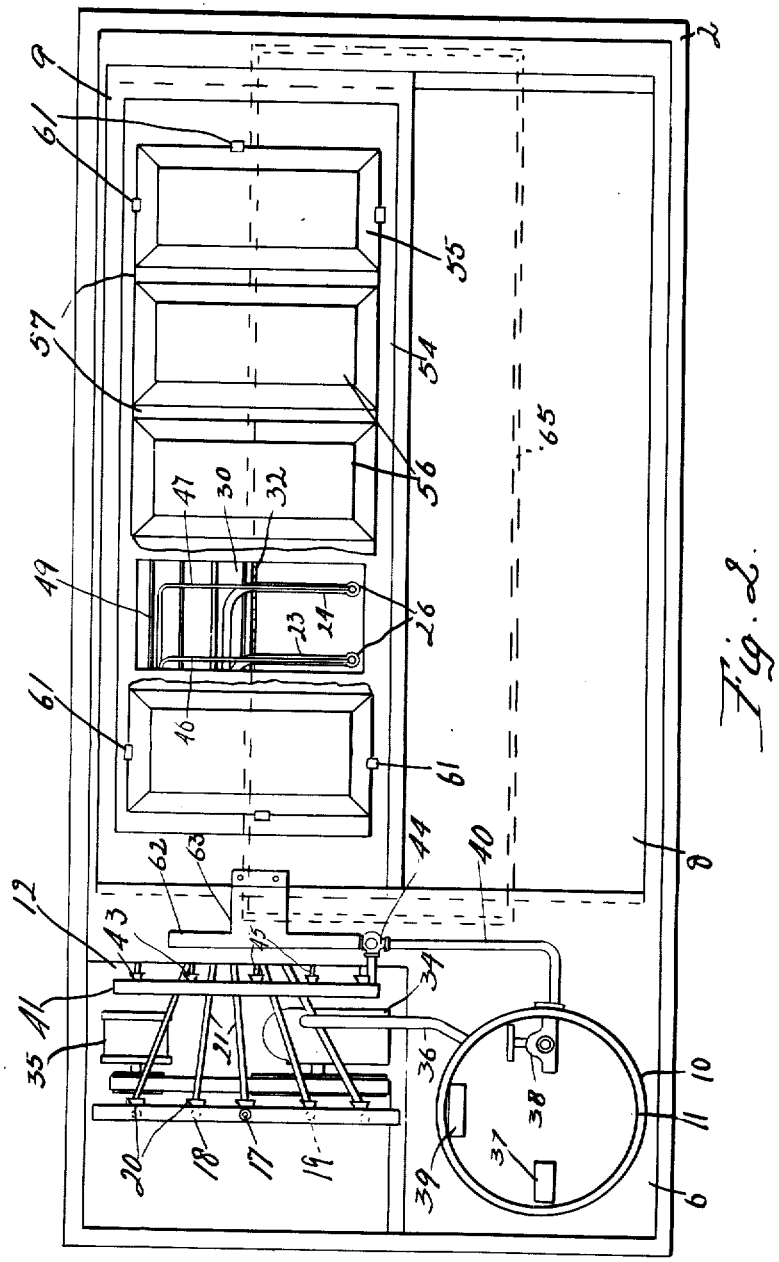

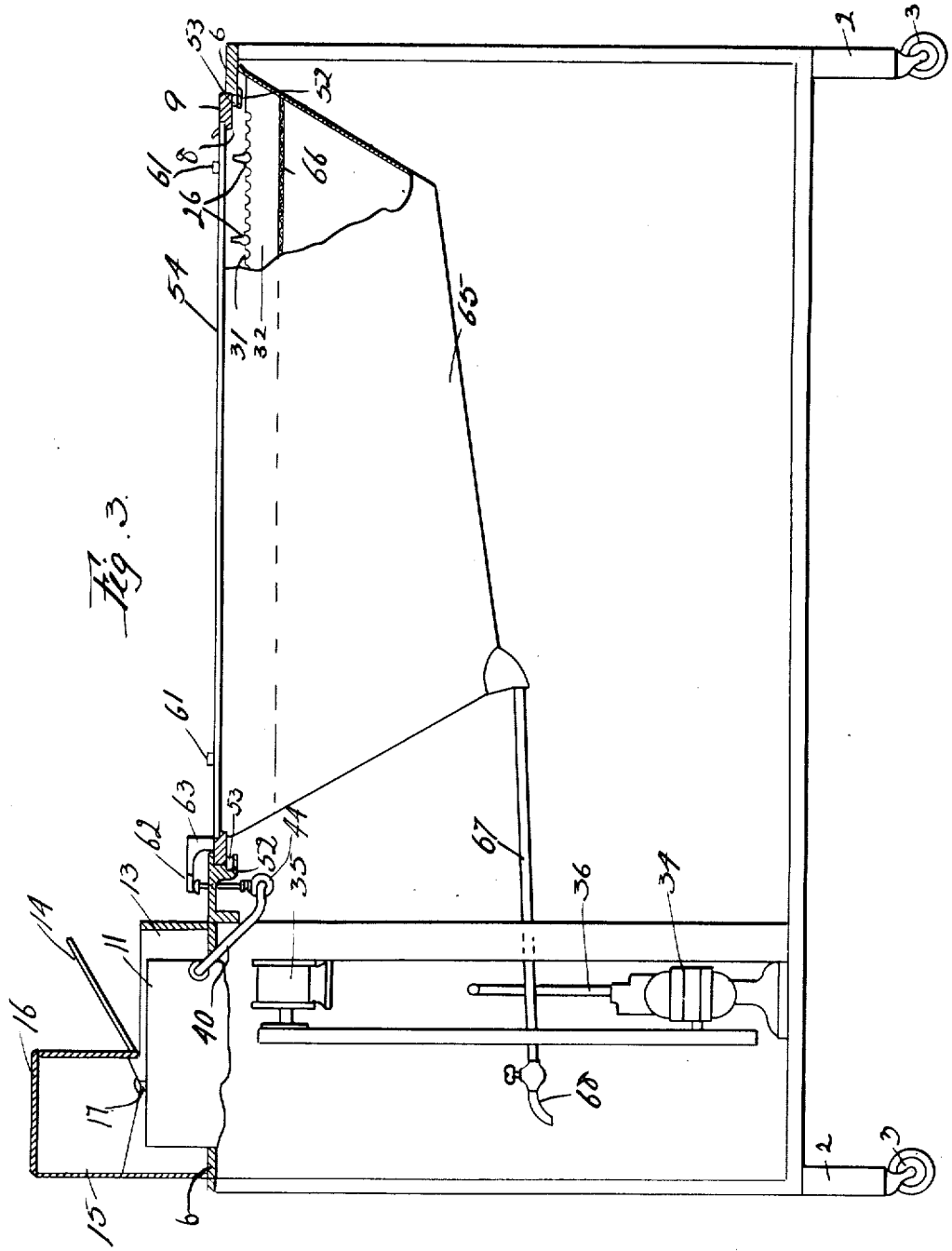

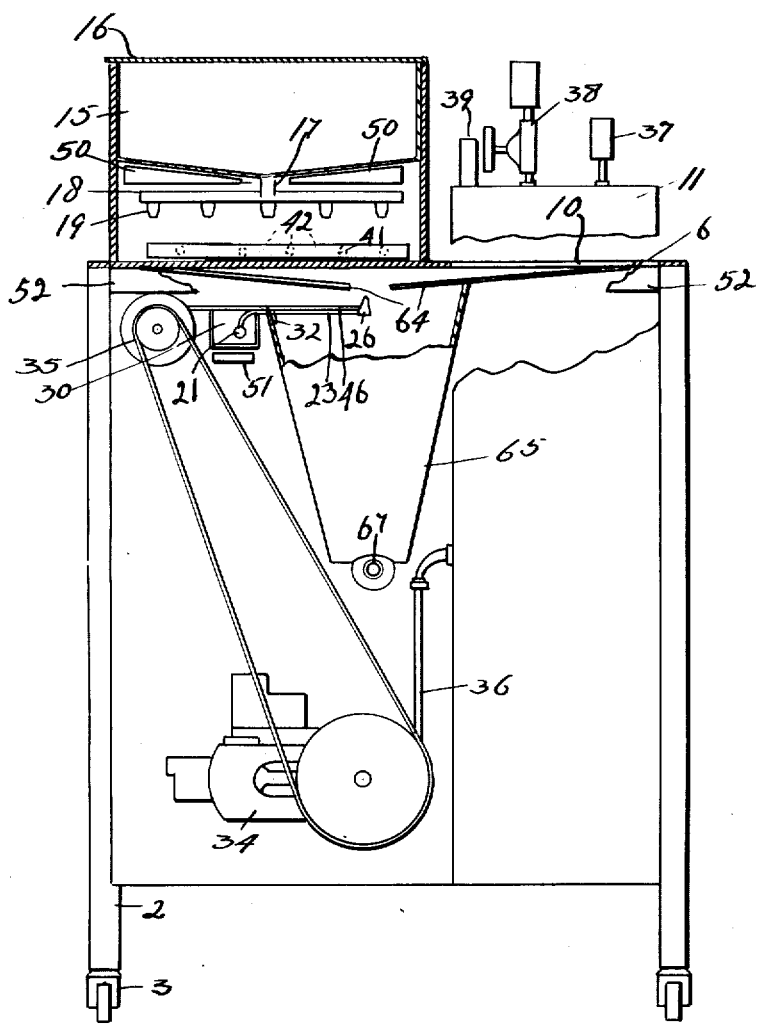

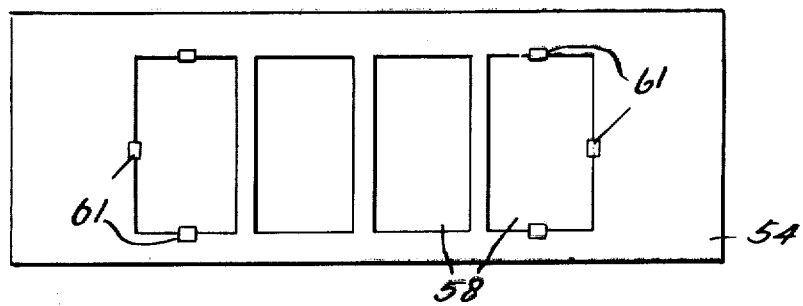
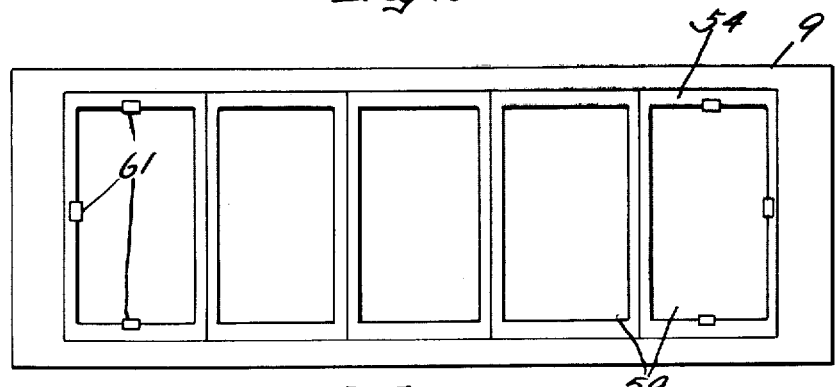
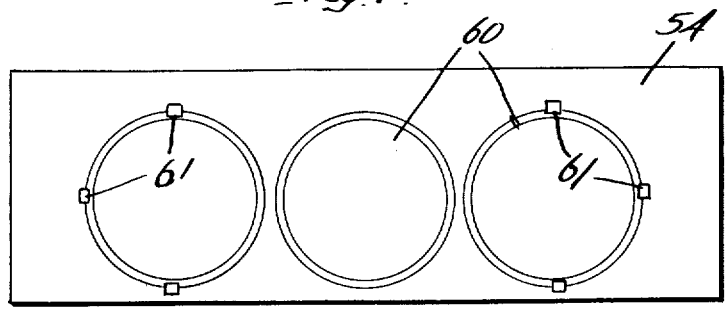

Patented Jan. 30, 1923.

1,443,407

UNITED STATES PATENT OFFICE.

FRANK WITTMANN, OF PHILADELPHIA, PENNSYLVANIA, ASSIGNOR, BY MESNE ASSIGNMENTS, TO WILLIAM C. McFARNAHAN AND NORMAN STEVENSON, BOTH OF BOSTON, MASSACHUSETTS.

PAN-GREASING MACHINE.

Application filed November 20, 1920. Serial No. 425,543.

*To all whom it may concern:*

Be it known that I, FRANK WITTMANN, a citizen of Germany (having declared his intention of becoming a citizen of the United States), residing at Philadelphia, in the county of Philadelphia and State of Pennsylvania, have invented new and useful Improvements in Pan-Greasing Machines, of which the following is a specification.

My invention relates to new and useful improvements in pan greasing machines, and has for its object to provide a self contained, small, compact portable machine provided with atomizers for atomizing a grease such as oil, lard or compounds, in a thin layer on the inside of bakers' pans, the latter acting as hoods during the atomizing process which prevent the grease settling on the outside of the pans.

Another object of the invention is to provide a pan greasing machine for atomizing evenly over the inside faces of the walls of pans to provide a film of grease of the desired thickness.

Another object of the invention is to provide a machine of this character which will require but a single operator and increasing the number of pans which may be greased in a given time as well as using a less amount of grease than is ordinarily used when greasing with a cloth, brush or common spraying nozzle.

A further object of the invention is to provide means for adjusting the atomizers to properly position them for atomizing or greasing pans of different sizes, shapes and positions of which relative to the pan nest, said atomizers being air controlled, the air being fed direct to the atomizer nozzles.

A still further object of the invention is to provide a pan supporting plate having openings therein corresponding to the different pans in a nest of pans, said supporting plate having means to hold the nest of pans thereon.

Other objects of the invention are to provide a pan greasing machine which will be sanitary, to provide an operating frame for holding the pan supporting plate which is removable over the atomizers, to provide an air valve actuated by said frame to start and stop the air supply to the atomizers, to provide a manifold with which the grease reservoir and atomizer supply pipes are connected, to provide heaters for the grease reservoir and supply pipes and to provide means for maintaining a supply of air at a predetermined pressure.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a perspective view of my pan greasing machine showing it ready for operation.

Fig. 2, is a plan view thereof with the grease reservoir, and one of the pans removed to show the relation of the parts relative to each other.

Fig. 3, is a side elevation thereof with the near side wall removed and portions broken away and the different supply pipes removed.

Fig. 4, is an end view thereof with the end wall removed, and portions broken away and shown in section.

Fig. 5, is a plan or face view of one of the pan supporting plates.

Fig. 6, is a similar view with one of said plates of different form mounted in the operating frame.

Fig. 7, is also a face view of another form of supporting plate.

Figure 8:
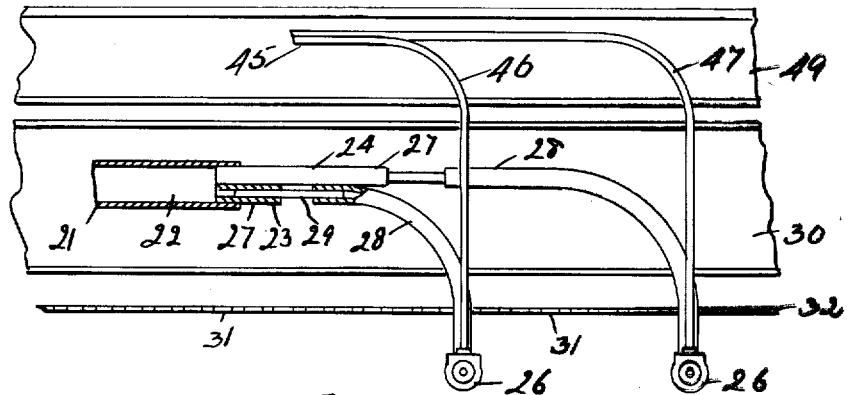
Fig. 8, is an enlarged fragmentary plan view illustrating the construction and relation of the different supply pipes to each other and the atomizer nozzles.
Figure 9:
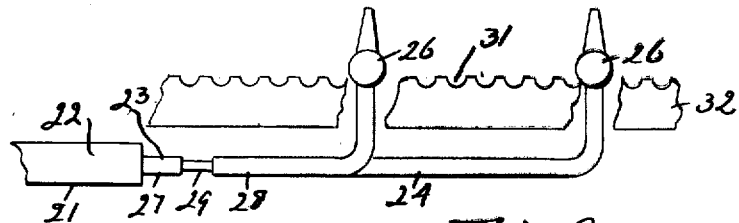
Fig. 9, is a fragmentary side elevation thereof.
Figures 10, 11:
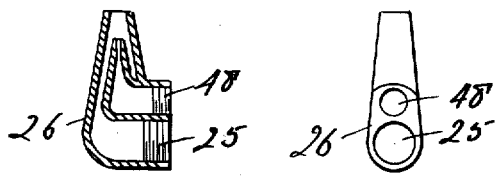
Fig. 10, is an enlarged sectional view of a conventional form of an atomizer nozzle.
Fig. 11, is an end view thereof.

In carrying out my invention as here embodied, 2 represents the frame of the machine preferably supported on casters 3 in order that the machine may be readily transported from place to place and to this frame are secured the sides 4, ends 5 and top 6, the latter having an opening 8 for the reception of the movable operating pan holding frame 9, another opening 10 through which projects the upper end of the air tank 11, and still another opening 12 whereby access may be had to the manifolds and other parts of the mechanism, this last named opening being normally closed by a housing 13 having a door 14 hinged thereto and forming the grease reservoir 15 having a removable cover 16.

From the lower portion or bottom of the grease reservoir leads a pipe 17 to the grease manifold or distributor 18 provided with a plurality of outlets 19 each of which is controlled by a suitable valve 20. To each of the outlets 19 is connected a grease supply pipe 21 which consists of a large feed pipe 22 from which leads two distributing pipes 23 and 24 arranged in a pair and leading to the grease chamber 25 of coacting atomizer nozzles 26. These grease supply pipes are preferably of metal and in order to provide for the adjustment of the atomizer nozzles I form each of the distributing pipes in two sections, the stationary section being numbered 27 and the movable section 28, one of these carries the rigidly attached connecting pipe 29 of smaller diameter so as to fit in the bore thereof while the opposite end slides in the other section.

These grease supply pipes are supported in a suitable member or trough 30 and each succeeding pipe is longer than the preceding one while one of the distributing pipes of each pair is longer than its mate. The different distributing pipes are held in their adjusted positions with the atomizer nozzles by causing them to register with the different notches or recesses 31 in the adjusting strip 32 which is supported in any suitable manner, one way of accomplishing the same being hereinafter described.

The air supply tank 11 is suitably mounted on the frame of the machine and is supplied with compressed air by means of an electrically operated pump 34 which as here shown is run by an electric motor 35 the feed pipe from the pump to the air tank being designated by the numeral 36. This tank is provided with the necessary gages such as the air gage 37 for indicating the pressure of air in the tank and the regulator 38 consisting of the ordinary working gage and controlling gage in some suitable position as on top of the air tank is located a starter 39 so that when the air pressure is below a predetermined amount said starter will close the electrical circuit through the motor so that air will be pumped therein under pressure and when the pressure of the air has reached another predetermined point the electrical circuit will be opened and the motor stopped.

From the air tank leads an air supply pipe 40 to the air manifold or distributor 41 which has a number of outlets 42, each controlled by a suitable valve 43 and in the supply pipe 40 is arranged an automatic closing valve 44 which normally shuts off the supply of air from the tank to the manifold as and for a purpose to be hereinafter more fully explained.

From each of the outlets 42 leads an air hose or pipe 45 each of which has two branches 46 and 47, said branches leading to a pair of cooperating atomizer nozzles and connecting with the air chamber 48 thereof. These air hose are preferably formed of rubber or other suitable flexible material so as to be readily adjustable during the different adjustments of the atomizers and they are supported in a suitable member or trough 49 located adjacent the member or trough 30.

When the pan greasing machine is in use the grease supply to the atomizers is continuous because of the slight difference in height of the grease reservoir above the ends of the nozzles and where the grease used is not a fluid, such as for instance lard, I provide suitable heating devices such as electric heaters 50 beneath the grease reservoir so as to reduce the consistency thereof or maintain it in a fluid like condition and other heating devices such as electric heaters 51 beneath the supply pipes 21 or beneath the supporting member means for said pipes so as to maintain the lard in the proper condition for atomizing. A supply of grease being in the chamber 25 of the atomizer nozzle as soon as the valve 44 in the air supply pipe 40 is opened air will be permitted to pass from the air tank to the different atomizers and produce the atomizing action.

At each end of the opening 8 is located a transverse track 52 provided with suitable anti-friction devices such as roller bearings 53 supporting the operating frame 9, the inner edges of which are grooved to receive a pan supporting plate 54 a number of which are shown in Figs. 5, 6 and 7. These supporting plates are all of the same size so as to be interchangeable, but each is provided with a different number, shape or size openings to accommodate the different shapes and sizes of pans or number of pans in a pan nest it being understood that bakers' pans are generally produced in a nest or set, each set or nest 55 consisting of a number of pans or receptacles 56 joined together by flanges 57.

In Fig. 5 I have shown a pan supporting plate having four openings 58 to accommodate a four pan nest or set while in Fig. 6 I have shown five larger openings 59 to accommodate a nest of pans of greater size and more receptacles, while in Fig. 7 the supporting plate is provided with only three openings 60 which are also of different configuration.

When a nest of pans is placed upon the pan supporting plate it is temporarily held in place by suitable spring clips 61 which will prevent its accidental displacement or removal from the supporting plate.

When a nest of pans has been placed upon the supporting plate said nest of pans may be used by the operator as the means for transmitting motion to the operating frame 9 causing the latter to move transversely of the machine and carry the pans or receptacles over the atomizers and as soon as movement is imparted to the operating frame the air valve 44 will be actuated by the ramp 62 contacting with the stem of said valve and actuating the same to open said valve, said valve stem being in the path of travel of the ramp which is carried by the operating frame 9, said ramp being here shown as supported by a bracket 63 attached to the frame 9. The ramp 62 is of such size and so positioned that when the frame has been moved a sufficient distance to pass the pans entirely over the atomizers said ramp will be disengaged from the air valve 44 and permit the same to automatically close and thereby shut off the air supply to the atomizer and during the atomizing action the pans act as hoods so as to prevent any grease settling on the outside of the pans which would be not only detrimental but wasteful and as the pans may be quickly moved back and forth over the atomizers a film of grease of the desired thickness will be applied to the pans and an experienced operator can so manipulate the movements that great speed may be attained in greasing the pans while the action of the atomizers will cause all of the walls to be properly greased.

If for any reason the grease supply is over abundant and it should drip from the pans or the atomizers it will drop into the baffle plates 64 of which there are preferably two, one at each side of the machine beneath the atomizers their inner or adjacent edges being spaced apart and being inclined from their inner edges toward the sides of the machine. The grease thus falling upon the baffle plates will flow toward their inner edges into the drain 65, first passing through a screen 66 to separate any burnt crumbs or other similar foreign material from the grease, said screen being suitably supported within the drain. From the drain leads an outlet pipe 67 having a spigot 68 whereby the grease may be drawn off from the drain when desired. The adjusting strip 32 hereinbefore referred to is preferably supported by one of the walls of the drain 65 as shown in Fig. 4.

From the foregoing description it will be seen that my device is self contained, compact and portable so that it may be readily moved from place to place where it is most convenient to carry on the pan greasing operations and when not in use it may be moved out of the way occupying but a small amount of space.

Of course I do not wish to be limited to the exact details of construction as herein shown as these may be varied within the limits of the appended claims without departing from the spirit of my invention.

Having thus fully described my invention, what I claim as new and useful is:—

1. A pan greasing machine comprising a frame having side walls, end walls and a top thereon, said top having openings therein, transverse tracks located at the ends of one of said openings, roller bearings therein, an operating frame supported by the roller bearings, a pan supporting plate having openings therein adapted to be supported by the frame, means carried by said plate for temporarily holding a nest of pans therein, and atomizers arranged in pairs and adjustable to align them with the openings in the pan supporting plate, said atomizers being connected with a grease and air supply.

2. A pan greasing machine comprising a frame having side walls, end walls and a top thereon, said top having openings therein, transverse tracks located at the ends of one of said openings, roller bearings therein, an operating frame supported by the roller bearings, a pan supporting plate having openings therein adapted to be supported by the frame, means carried by said plate for temporarily holding a nest of pans therein, baffle plates located beneath the opening in which the frame is mounted their inner edges being spaced apart, a drain located beneath said baffle plates, means for drawing off the contents of said drain, and atomizers projecting over said drain with their nozzles beneath the spaced inner edges of the baffle plates.

3. A pan greasing machine comprising a frame having side walls, end walls and a top therein, said top having an opening therein, transverse tracks located at the ends of said opening, an operating frame for movement across said opening, a pan supporting plate having openings therein adapted to be supported by said last named frame, means carried by said plate for temporarily holding a nest of pans therein, baffle plates located beneath the opening in which the operating frame is mounted with their inner edges spaced apart and atomizers arranged in pairs with their outlet ends projecting through the space between the baffle plates.

4. A pan greasing machine comprising a frame having side walls, end walls and a top therein, said top having an opening therein, transverse tracks located at the ends of said opening, an operating frame for movement across said opening, a pan supporting plate having openings therein adapted to be supported by said last named frame, means carried by said plate for temporarily holding a nest of pans therein, baffle plates located beneath the opening in which the operating frame is mounted with their inner edges spaced apart, atomizers having their outlet ends projecting between the spaced edges of the baffle plates, an air supply connected with the atomizers, and means for controlling said air supply by the movements of the supporting frame across the opening in the top of the main frame.

5. A pan greasing machine comprising a frame having side walls, end walls and a top therein, said top having an opening therein, transverse tracks located at the ends of said opening, an operating frame for movement across said opening, a pan supporting plate having openings therein adapted to be supported by said last named frame, means carried by said plate for temporarily holding a nest of pans therein, baffle plates located beneath the opening in which the operating frame is mounted with their inner edges spaced apart, atomizers having their outlet ends projecting between the spaced edges of the baffle plates, an air supply connected with the atomizers, a valve for controlling said air supply and a ramp carried by the operating frame and adapted to coact with said valve for opening the same to permit air to flow to the atomizers.

6. A pan greasing machine comprising a main frame having side walls, end walls and a top, said top having an opening therein, transverse tracks located at the ends of said opening, a pan supporting plate having an opening therein adapted to be supported by the last named frame, atomizers underlying the operating frame, means for supplying air to the atomizers, a valve for controlling the air supply, and means carried by the operating frame for actuating said valve during movement of the operating frame across the opening in the top of the main frame.

7. A pan greasing machine having a movable operating frame, a pan-supporting member carried by said frame, atomizers, means for supplying air to the atomizers, a valve for controlling the air supply, means whereby the initial movement of said operating frame will actuate the valve to open the air supply, and means whereby, after the frame has moved a predetermined distance to pass the pans over the atomizers, the valve will be actuated to shut off the air supply.

8. A pan greasing machine having a movable operating frame which also carries the pans, atomizers, means for supplying air to the atomizers, and means carried by the operating frame to open the air supply at a predetermined point in the movement of the operating frame and to shut off the air supply at another predetermined point in its movement.

9. A pan greasing machine having a movable operating frame adapted to carry the pans to be greased, means whereby the pans, when placed upon the operating frame, start the movement of said frame, atomizers, means for supplying air to the atomizers, means carried by the operating frame to open the air supply when the said frame has moved a predetermined distance, and means controlled by the movement of the operating frame to shut off the air supply when it has moved a predetermined distance to pass the pans entirely over the atomizers.

In testimony whereof, I have hereunto affixed my signature.

FRANK WITTMANN.

Certificate of Correction.

It is hereby certified that the name of the first-mentioned assignee in Letters Patent No. 1,443,407, granted January 30, 1923, upon the application of Frank Wittmann, of Philadelphia, Pennsylvania, for an improvement in "Pan-Greasing Machines," was erroneously written and printed as "William C. McFarnahan," whereas said name should have been written and printed as *William C. McTarnahan*, as shown by the records of assignments in this office; and that the said Letters Patent should be read with this correction therein that the same may conform to the record of the case in the Patent Office.

Signed and sealed this 27th day of February, A. D., 1923.

[SEAL.]

KARL FENNING,
*Acting Commissioner of Patents.*